US008620492B2

(12) United States Patent
Hagerott et al.

(10) Patent No.: US 8,620,492 B2
(45) Date of Patent: Dec. 31, 2013

(54) YAW DAMPING SYSTEM AND METHOD FOR AIRCRAFT

(75) Inventors: Steven G. Hagerott, Wichita, KS (US); Steven Klausmeyer, Wichita, KS (US); Gonzalo E. Mendoza, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 5 days.

(21) Appl. No.: 13/405,836

(22) Filed: Feb. 27, 2012

(65) Prior Publication Data
US 2013/0226374 A1 Aug. 29, 2013

(51) Int. Cl.
G01C 23/00 (2006.01)
G05D 1/00 (2006.01)
G05D 1/08 (2006.01)

(52) U.S. Cl.
USPC ................ 701/3; 244/178; 244/181; 244/195

(58) Field of Classification Search
None
See application file for complete search history.

(56) References Cited

U.S. PATENT DOCUMENTS

| | | | |
|---|---|---|---|
| 4,046,341 A | 9/1977 | Quinlivan | |
| 4,092,716 A * | 5/1978 | Berg et al. | 701/3 |
| 4,460,858 A * | 7/1984 | Ashland | 318/585 |
| 4,964,599 A | 10/1990 | Farineau | |
| 5,008,825 A * | 4/1991 | Nadkarni et al. | 701/4 |
| 5,060,889 A * | 10/1991 | Nadkarni et al. | 244/183 |
| 5,072,893 A | 12/1991 | Chakravarty et al. | |
| 5,170,969 A * | 12/1992 | Lin | 244/194 |
| 5,375,794 A | 12/1994 | Bleeg | |
| 5,396,415 A * | 3/1995 | Konar et al. | 700/42 |
| 5,598,991 A | 2/1997 | Nadkarni et al. | |
| 5,669,582 A | 9/1997 | Bryant et al. | |
| 6,352,223 B1 | 3/2002 | Larramendy | |
| 6,915,989 B2 | 7/2005 | Najmabadi et al. | |
| 6,923,405 B2 | 8/2005 | Cline et al. | |
| 7,090,172 B2 * | 8/2006 | Kubica et al. | 244/195 |
| 7,191,985 B2 | 3/2007 | Najmabadi et al. | |
| 7,258,307 B2 | 8/2007 | Enzinger et al. | |
| 7,878,461 B2 | 2/2011 | Hirvonen et al. | |
| 7,984,878 B2 | 7/2011 | Hirvonen | |
| 8,016,243 B2 | 9/2011 | Beaufrere | |
| 8,104,720 B2 | 1/2012 | Hirvonen et al. | |
| 2003/0205644 A1 | 11/2003 | Najmabadi et al. | |
| 2004/0155156 A1 * | 8/2004 | Kubica | 244/195 |
| 2005/0116095 A1 | 6/2005 | Cline et al. | |
| 2006/0237594 A1 | 10/2006 | Najmabadi et al. | |
| 2008/0203232 A9 | 8/2008 | Enzinger et al. | |
| 2009/0047636 A1 * | 2/2009 | Van Biervliet | 434/55 |
| 2010/0070114 A1 | 3/2010 | Puig et al. | |
| 2011/0070564 A2 * | 3/2011 | Van Biervliet | 434/55 |
| 2012/0029770 A1 * | 2/2012 | Hirao et al. | 701/38 |
| 2012/0078470 A1 * | 3/2012 | Hirao et al. | 701/38 |

* cited by examiner

Primary Examiner — James Trammell
Assistant Examiner — Demetra Smith-Stewart
(74) Attorney, Agent, or Firm — Lathrop & Gage LLP

(57) ABSTRACT

An alternative system for damping the dutch roll mode in an aircraft is provided using roll control surfaces. Classical yaw dampers for the dutch roll mode utilize the yaw control surfaces such as a rudder to dampen the dutch roll mode oscillations. An alternative damper is described that utilizes roll control surfaces such as spoilers or ailerons to dampen the dutch roll mode.

8 Claims, 7 Drawing Sheets

YAW DAMPING SYSTEM AND METHOD FOR AIRCRAFT

BACKGROUND

1. Field of the Invention

The yaw damping system and method are in the field of aircraft control systems. More specifically, the yaw damping system and method are in the field of damping systems for controlling the flight modes of aircraft, namely the dutch roll mode.

2. Description of the Related Art

When an aircraft is disturbed from steady flight it exhibits varying behavior depending on the type of disturbance and the aerodynamic characteristics of the aircraft. The types of behavior exhibited by aircraft are categorized as various aerodynamic modes, including the spiral mode and the dutch roll mode, among others. For example, the spiral mode, if not stabilized, may lead an aircraft to enter a spiral dive leading to a crash.

Aircraft may be designed to stabilize the various modes, through design elements such as the provision of dihedral wings to stabilize the spiral mode. Alternatively, the aircraft control systems may be designed to dampen or counteract instability in the modes. The system and method described herein are designed to dampen instability in the dutch roll mode.

The dutch roll mode is a mode that includes a roll oscillation with an out-of-phase yaw oscillation. The mode is excited by the use of rudder or ailerons creating a sideslip, whereby the movement of the relative wind across the aircraft has a component that is perpendicular to the longitudinal axis of the aircraft. In other words, the nose of the aircraft is not pointing directly into the relative wind.

If the aircraft has both positive lateral stability and directional stability, the sideslip produces a roll moment and a yaw moment to reduce the sideslip. These moments are the result of aerodynamic forces acting on the aircraft due to the sideslip that tend to induce both a roll moment and a yaw moment to correct the sideslip. For example, the roll moment may be induced by differences in wind speed over the wings of the aircraft, which causes the aircraft to bank in a manner that tends to remove the sideslip. The aerodynamic forces also produce a yaw moment that tends to reduce the sideslip by turning the nose of the aircraft into the relative wind. This yaw moment may be induced by pressure on the vertical stabilizer surfaces of the aircraft.

In many aircraft designs, the yaw moment is weaker than the roll moment created by a sideslip, and lags in time behind the roll moment created by the sideslip. The roll moment returns the aircraft to level non-sideslip flight before the yaw moment, and thus the yaw moment continues to turn the aircraft past level non-sideslip flight. This time lag causes the aircraft to overshoot the non-sideslip orientation and enter a sideslip in the opposite direction. The process then reverses itself and if the dutch roll mode is unstable in the given aircraft, the oscillations will tend to increase in amplitude over time.

In order to dampen an unstable dutch roll mode, aircraft may utilize a classical yaw damper to counteract the lagging yaw moment created by the sideslip. In a classical yaw damper, the yaw rate of the aircraft, adjusted by a proportional gain, is fed back to the rudder. This counteracts the yaw rate component of the aerodynamic reaction to the sideslip condition and dampens the dutch roll mode. Thus the yaw moment created by the sideslip is counteracted by control surface input that is proportional to and in opposition to the yaw moment.

The control surface input necessary to counteract the yaw moment may be generated and applied without pilot intervention by the aircraft control systems, which may continuously generate and apply the necessary input throughout operation of the aircraft.

While the classical yaw damper effectively dampens the dutch roll mode, it is susceptible to failure from a variety of faults, and many aircraft are required to provide backup mechanisms for damping the dutch roll mode. For example, if an aircraft's yaw control surfaces jam or are otherwise inoperable, the classical yaw damper will be inoperative as a result. Therefore, it is desirable to provide an alternative damper for the dutch roll mode that is not dependent on the yaw control surfaces of the aircraft, and that can independently dampen the dutch roll mode if the classical yaw damper is inoperative.

It is also desirable that any alternative damper for the dutch roll mode must be compatible with the classical yaw damper such that the two dampers may operate simultaneously without reducing the stability of the aircraft or the efficacy of the other damper mechanism. This is necessary because both damping mechanisms must be able to operate continuously throughout the operation of the aircraft. Thus in embodiments it is desirable to utilize control surfaces other than the yaw control surfaces to dampen the dutch roll mode.

The alternative yaw damper described herein provides effective independent damping of the dutch roll mode and it works in cooperation with classical yaw dampers without reducing their efficacy.

SUMMARY OF THE INVENTION

In an embodiment, the yaw damping system comprises a method for damping the dutch roll mode in an aircraft having a roll control surface, comprising the steps of: measuring at least one parameter of the motion of the aircraft; calculating a damping signal that is proportional to the at least one parameter of the motion of the aircraft; and actuating the roll control surface in proportion to the damping signal.

The step of calculating a damping signal may further comprise multiplying the at least one parameter of motion by a proportional gain. In other embodiments, the step of calculating a damping signal may further comprise the steps of calculating a derivative function of the at least one parameter of motion; multiplying the derivative function by a proportional gain; and adding the result to the damping signal. The step of calculating a damping signal may further comprise the steps of calculating a integral function of the at least one parameter of motion; multiplying the integral function by a proportional gain; and adding the result to the damping signal.

In embodiments of the method, at least one parameter of motion is selected from the group consisting of lateral acceleration, sideslip angle, true airspeed, bank angle and yaw rate. In additional embodiments, a washout filter is applied to the at least one parameter of motion to remove long term effects prior to application of the proportional, integral and derivative gains to the parameter of motion.

In other embodiments, the step of calculating a damping signal further comprises the steps of measuring the roll rate of the aircraft; multiplying the roll rate by a proportional gain; and adding the result to the damping signal. In alternative embodiments, a washout filter is applied to the roll rate signal to remove long term effects prior to applying the proportional gain to the roll rate.

The step of calculating a damping signal may further comprise the steps of calculating a derivative function for the roll rate; multiplying the derivative function by a proportional gain; and adding the result to the damping signal.

The step of calculating a damping signal may further comprise the steps of calculating an integral function for the roll rate; multiplying the integral function by a proportional gain; and adding the result to the damping signal.

An alternative embodiment of the method for damping the dutch roll mode of an aircraft comprises the steps of: measuring at least one parameter of motion of an aircraft; calculating the sideslip rate of the aircraft based on the at least one parameter of motion; calculating a damping signal that is proportional to the sideslip rate of the aircraft; and actuating the roll control surface in proportion to the damping signal. The step of calculating a damping signal may further comprise multiplying the sideslip rate by a proportional gain. It may further comprise the steps of calculating a derivative function of the sideslip rate; multiplying the derivative function by a proportional gain; and adding the result to the damping signal. It may also further comprise the steps of calculating a integral function of the sideslip rate; multiplying the integral function by a proportional gain; and adding the result to the damping signal.

In some embodiments, the step of calculating the sideslip rate comprises estimating the sideslip rate based on the lateral acceleration of the aircraft. In alternative embodiments, the step of calculating the sideslip rate comprises calculating the sideslip rate based on the lateral acceleration, the airspeed, the bank angle and the yaw rate. In some embodiments a washout filter is applied to the measured parameter to remove long term effects.

In alternative embodiments, the step of calculating a dampening signal further comprises the steps of measuring the roll rate of the aircraft; multiplying the roll rate by a proportional gain; and adding the result to the damping signal. In still further embodiments, the step of calculating a damping signal further comprises the steps of calculating a derivative function for the roll rate; multiplying the derivative function by a proportional gain; and adding the result to the damping signal and additionally may comprise the steps of calculating an integral function for the roll rate; multiplying the integral function by a proportional gain; and adding the result to the damping signal. In additional embodiments, a washout filter is applied to the roll rate to remove long term effects.

DETAILED DESCRIPTION

One of the aerodynamic flight modes of an aircraft is the dutch roll mode, wherein a rocking oscillation, a roll moment, is coupled with a lagging "tail wag," a yaw moment. In some aircraft the dutch roll mode may be unstable and lead to increasing aircraft oscillation and potential catastrophic aircraft failure.

Figure 1:
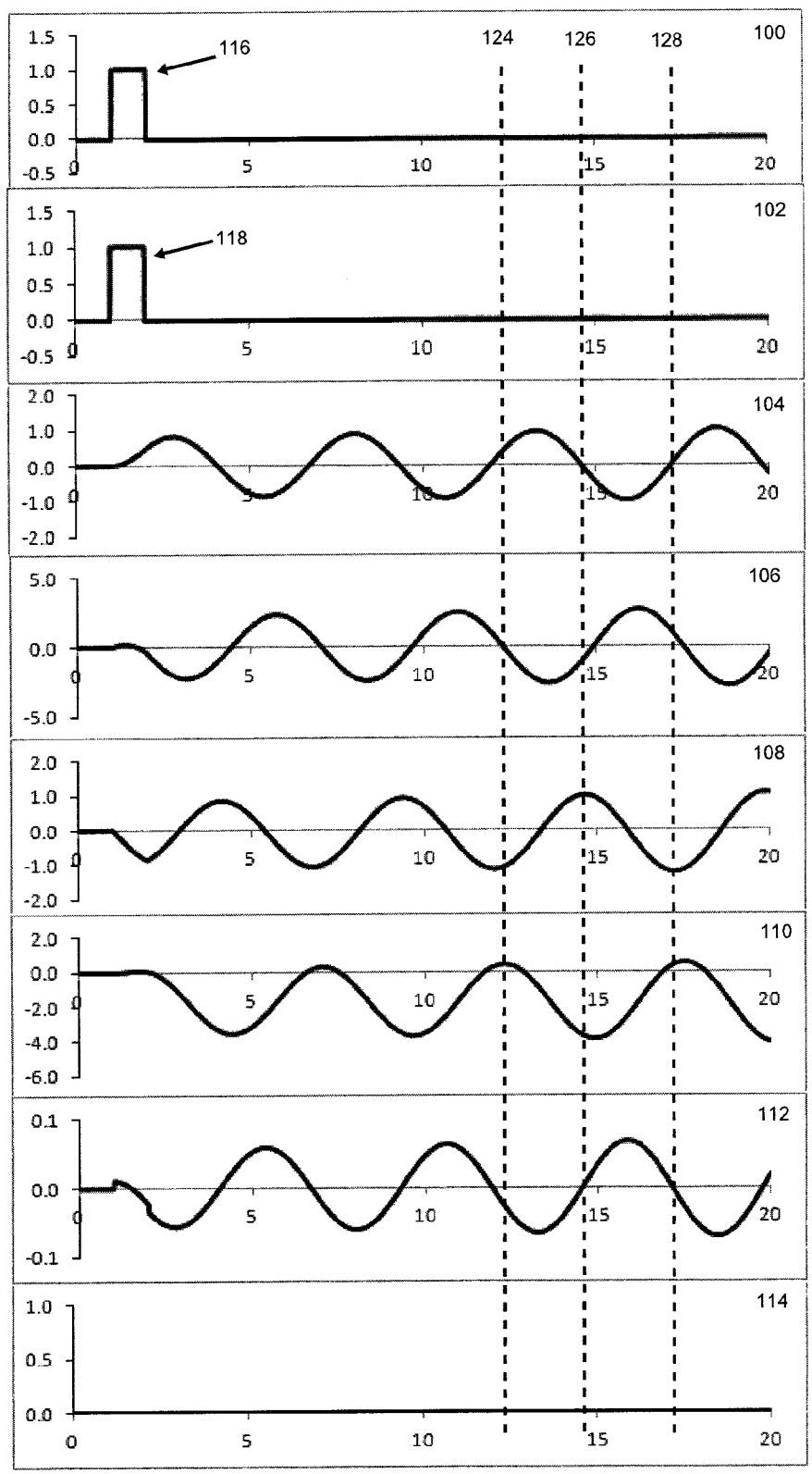
FIG. 1 is a time history of various parameters of an aircraft with an unstable dutch roll mode without damping.

Referring now to FIG. 1, a time history of various parameters of an aircraft with an unstable dutch roll mode without damping is depicted. Graph 100 depicts the command signal of the aircraft flight control system to the rudder or other yaw control surface for the aircraft. The command signal shown in graph 100 of FIG. 1 comprises a brief rudder deflection command 116 in one direction. Rudder command signals like this rudder singlet are commonly used to excite the dutch roll mode by creating a sideslip. Other commands that induce sideslip, such as an aileron input or a rudder doublet, may also be used to excite the dutch roll mode. The rudder deflection 116 does not comprise a part of the dutch roll mode, but serve to initiate the unstable mode in the aircraft.

Graph 102 depicts the actual deflection of the rudder or other yaw control surface resulting from the command input. The rudder deflection 118 results from rudder command input 116, and since there is no yaw damper in operation the rudder deflection matches the command input. Graph 110 depicts the changing bank angle of the aircraft. Graph 114 depicts roll control surface deflection, such as aileron or spoiler deflection. In the simulation depicted in the figures, graph 114 represents aileron deflection, but in embodiments of the alternative damper described herein other control surfaces such as spoilers located on the wings may also be utilized. In the time history depicted in FIG. 1, no roll control surface deflection occurs, and no yaw control surface deflection occurs after the initial commands that excite the dutch roll mode.

Graphs 104, 106, 108, and 112 depict the sideslip angle, the roll rate, the yaw rate, and the lateral acceleration (as ratio Ny defined below), respectively, of the aircraft throughout the time history. Rudder deflection 118 induces a slight sideslip angle, a roll moment and a yaw moment immediately after the deflection is initiated as shown in the time history diagrams. The positive lateral stability of the aircraft induces a roll moment that causes the aircraft to roll in the opposite direction to remove the sideslip. Simultaneously, the sideslip angle induces a yaw moment that tends to remove the sideslip as a result of the directional stability of the aircraft.

In many aircraft the positive lateral stability is stronger than the directional stability. As a result, the roll moment caused by lateral stability removes the sideslip and a lagging yaw moment due to the aircraft's directional stability causes the aircraft to yaw in the other direction, simultaneously inducing a slight roll. This begins the cycle in the opposite direction, and without damping the system begins to suffer from increasing oscillation resulting in the rocking motion of the wings combined with a lagging "tail wag" of the aircraft. This is depicted in the increasing amplitude of the roll and yaw rates 106 and 108, respectively, as time progresses in FIG. 1.

The time lag of the yaw oscillation can be seen at times 124 and 126. At time 124, the roll rate is zero, indicating that the aircraft is at the maximum roll angle for the cycle, which is also indicated by graph 110 showing the absolute roll angle. As the magnitude of the roll rate subsequently increases the aircraft is rolling back towards level flight, as a result of the lateral stability of the aircraft. At time 126, the roll rate has diminished as the sideslip angle approaches zero as shown in graph 104 and the aircraft is pointed directly into the relative wind. However, the yaw rate lags the roll rate, and peaks near time 126, pushing the nose of the aircraft through the wind and creating a sideslip angle in the opposite direction. This creates a tendency for the roll rate to increase in the other direction, starting the cycle in the opposite direction. When the aircraft nose is again pointing into the relative wind with zero sideslip at time 128, the yaw rate again pushes the nose of the aircraft into a sideslip in the other direction.

The dutch roll mode instability contains a roll component and a yaw component. Thus by counteracting either roll or yaw component, the change in sideslip angle may be counteracted and the dutch roll mode damped out. The classical method of doing this is to measure the yaw rate of the aircraft and feed that signal back into the yaw control surface of the aircraft with a gain factor. In a common implementation of this dutch roll damping method, the rudder of the aircraft is automatically deflected by the flight control system to counteract the yaw rate.

Figure 2:
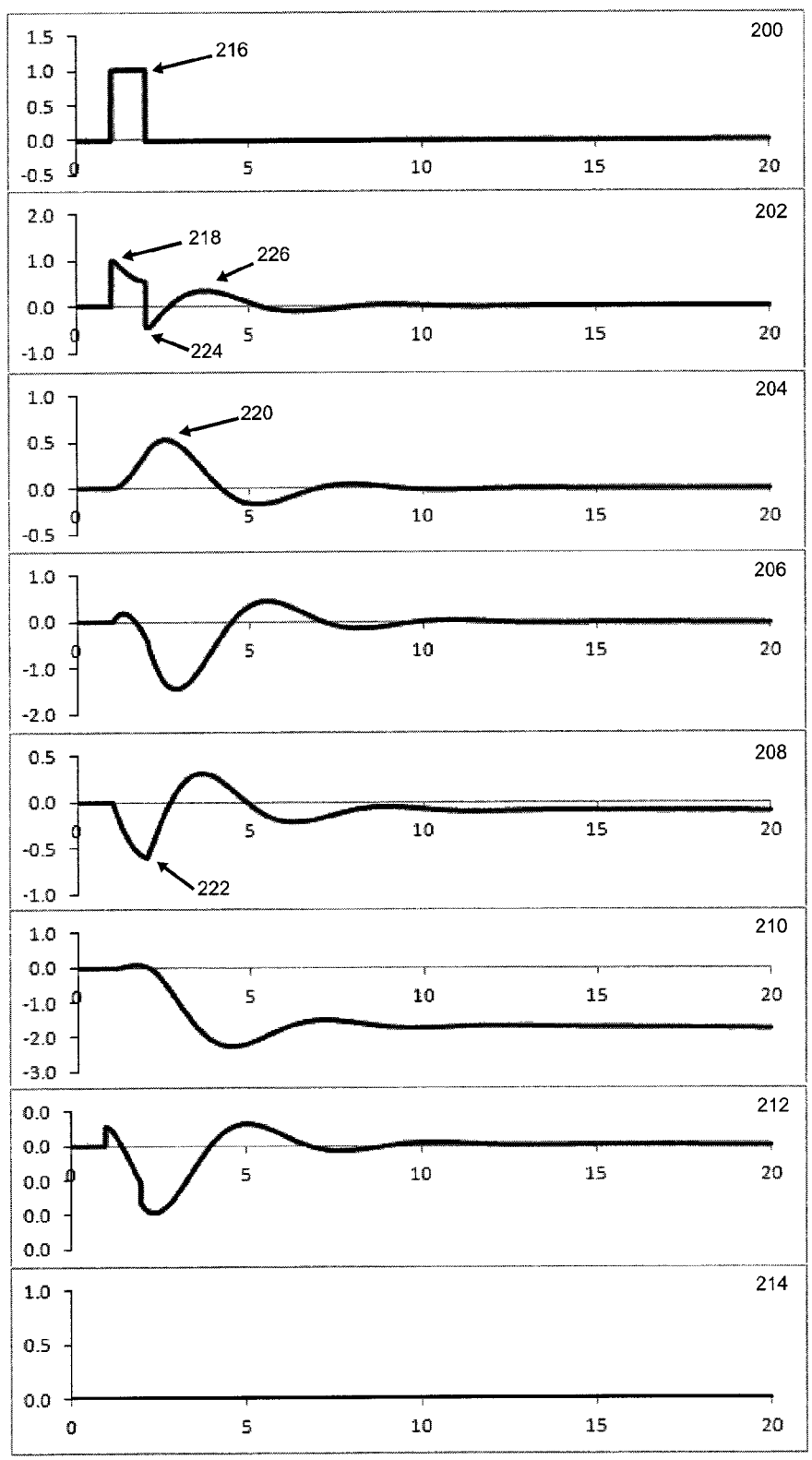
FIG. 2 is a time history of various parameters of an aircraft with an unstable dutch roll mode utilizing a classical yaw damper.

An implementation of the classical yaw damper is depicted in FIG. 2. The time history in FIG. 2 depicts an aircraft with an unstable dutch roll mode utilizing only a classical yaw damper. The basic operation of the classical yaw damper is to feedback the yaw rate, with appropriate gain applied, to the rudder to generate an opposing yaw command to overcome the yaw component of the dutch roll mode and allow the aircraft to settle on level flight as a result of the roll moment created by the lateral stability of the aircraft.

FIG. 2 depicts various time history graphs, including yaw command signal 200, yaw control surface deflection 202, sideslip angle 204, roll rate 206, yaw rate 208, bank angle 210, lateral acceleration 212 and roll control surface deflection 214.

Graph 200 depicts the rudder command signal, including the rudder command 216 that are used to excite the dutch roll mode. Graph 202 depicts the actual rudder deflections caused by the combination of the command signal 200 and the classical yaw damper. Rudder deflection 218 results from command input 216. This initial rudder deflection results in sideslip angle 220. The rudder deflection also causes a roll moment and yaw moment to develop as shown in graphs 206 and 208.

The classical yaw damper feeds yaw rate 208 back into the rudder control signal resulting in a yaw command input to be added to the command signal show in graph 200, resulting in an alteration to the original rudder command 200. The actual rudder deflection shown in graph 202 comprises the sum of the rudder command 200 and the yaw rate 208 multiplied by a gain factor. The change in rudder deflection 218 and the additional rudder deflections 224 and 226 arise from the feedback of the yaw rate. As a result rudder deflection 218 is smaller in magnitude than the command input 216, and the rudder is deflected in the opposite direction and then back to the same direction again. As the command input 200 ceases, the yaw damper acts to damp out the oscillations that create the dutch roll mode.

After rudder command input 216, command input 200 ceases and the yaw damper causes rudder deflections 224 and 226 as feedback for yaw rate 222 and the following yaw rate oscillations. This quickly damps the yaw rate through time to a steady state condition with no sideslip.

Often aircraft utilizing the classical yaw damper have washout filters to remove the long term effects of the feedback loop. Without such a washout filter, the yaw damper would counteract the rudder inputs from the pilot of the aircraft reducing the pilot's control of the aircraft, in the same manner as seen in FIG. 2. The washout filter typically utilizes a time constant to remove pilot-generated yaw rate, such as that present in a steady level turn, as compared to sideslip resulting from transient conditions. Since pilot command inputs typically occur at a much lower frequency than the oscillations resulting from excitation of the dutch roll mode, a filter that removes low frequencies before applying the proportional gain will prevent the yaw damper from impeding the pilot's input of yaw rate-inducing commands. Alternatively, the feedback gain may be applied to a constructed betadot (time derivative of sideslip angle) signal, which produces a signal that goes to zero in a steady level turn.

The alternate yaw damping system described herein utilizes the ailerons or other roll surfaces such as spoilers to damp the dutch roll mode. This provides redundancy and higher availability of the damping of the dutch roll mode, thereby increasing safety in the aircraft. The use of roll surfaces that are already electrically operated, such as spoilers, allows the yaw damping system to be utilized on an aircraft with little additional expense or complexity.

As described above, the dutch roll mode is caused by out-of-phase yaw and roll moments arising from aerodynamic forces caused by sideslip angle $\beta$. As discussed in U.S. Pat. No. 4,046,431 the rate of change of the sideslip $\beta$ with time of an aircraft can be calculated as follows:

$$\frac{d\beta}{dt} = p\sin\alpha - r\cos\alpha + \frac{a_y\cos\beta - (a_x\cos\alpha + a_z\sin\alpha)\sin\beta}{V_A} + \quad (1)$$

$$\frac{g}{V_A}[\cos\theta\sin\phi\cos\beta - \sin\theta\sin\beta\cos\alpha - \cos\theta\cos\phi\sin\alpha\sin\beta]$$

where p is the roll rate, r is the yaw rate, $\alpha$ is the angle of attack, $a_i$ represents the acceleration along the x, y and z axes, and $V_A$ is the velocity of the aircraft. The angle $\theta$ is the angle between the horizontal plane and the longitudinal x axis of the aircraft, and the angle $\phi$ is the angle of rotation of the y axis of the aircraft.

Assuming that the sideslip $\beta$ is small, $\sin \beta \approx 0$ and $\cos \beta = 1$, Equation 1 may be approximated as:

$$\frac{d\beta}{dt} \approx p\sin\alpha - r\cos\alpha + \frac{a_y}{V_A} + \frac{g}{V_A}[\cos\theta\sin\phi] \quad (2)$$

Substituting rs=p sin $\alpha$–r cos $\alpha$ and $$Ny = \frac{a_y}{g}$$

into Equation 2:

$$\frac{d\beta}{dt} \approx rs + \frac{g}{V_A}[Ny + \cos\theta\sin\phi] \quad (3)$$

The rs term of Equation 3 contains a roll component and a yaw component, the p and r components, respectively. Thus by counteracting either roll or yaw component, the change in sideslip angle may be counteracted and the dutch roll mode damped out. As described in reference to FIG. 2, a classical method of damping the dutch roll mode is damping the yaw component.

In the alternative yaw damper utilizing roll control surfaces described herein, sensors are utilized to measure various parameters of the motion of the aircraft. The measured parameters may include lateral acceleration or sideslip, true airspeed, bank angle and yaw rate. The parameters are sensed by means known in the art of aircraft technology for measuring inertial motion. In some embodiments of the alternative damper, the measured parameter of motion is multiplied by a proportional gain, and summed with a combination of derivative gain multiplied by a derivative function of the motion signal, and an integral gain multiplied by an integral function of the motion signal. A washout filter may be utilized to remove long term effects from the feedback loop for the various measured parameters.

The output of the summation of signals is then added to pilot command input for the lateral control surfaces such as the ailerons or spoilers. The resulting change in the roll rate of the aircraft alters the out-of-phase relationship between the roll and the yaw components of the dutch roll, and prevents the development of an unstable dutch roll mode. Other control surfaces could be used where they are capable of providing a rolling moment on the airplane. The gain values are typically scheduled with air data parameters such as dynamic pressure and Mach number. This scheduled feedback acts to augment the aircraft's rolling moment due to sideslip, a parameter which affects the aircraft's dutch roll mode.

The alternative damper has the effect of dampening the initial roll response of the aircraft, so in some embodiments the damper may include the addition of a roll rate feedback to mitigate an undesired reduction in the roll mode time constant of the aircraft. A washout function added to this roll rate feedback may be included to mitigate the effects of the roll rate feedback on the spiral mode of the aircraft. This signal is then operated upon with the previously discussed proportional, derivative, and integral functions to provide its contribution to the roll surface command.

In another embodiment of the alternative damper, the lateral acceleration, airspeed, bank angle, yaw rate, and other parameters as necessary are used to calculate a sideslip rate $\dot{\beta}$ or $$\frac{d\beta}{dt}$$

as described above. A washout filter may also be applied to the measured parameters to remove long term effects unrelated to the dutch roll mode. The sideslip rate calculation provides a lead compensation capability for the flight control system because it is proportional to the sideslip rate, instead of the lagging sideslip or sideslip estimate based on lateral acceleration alone. An approximation to this sideslip rate could include utilization of just the yaw rate signal. Similar to the prior embodiment, the combination of sideslip, sideslip rate and roll rate signals are then operated on by the prior mentioned combination of proportional, derivative and integral gains and functions and summed together with the pilot command inputs to yield a lateral control surface command.

Figure 3:
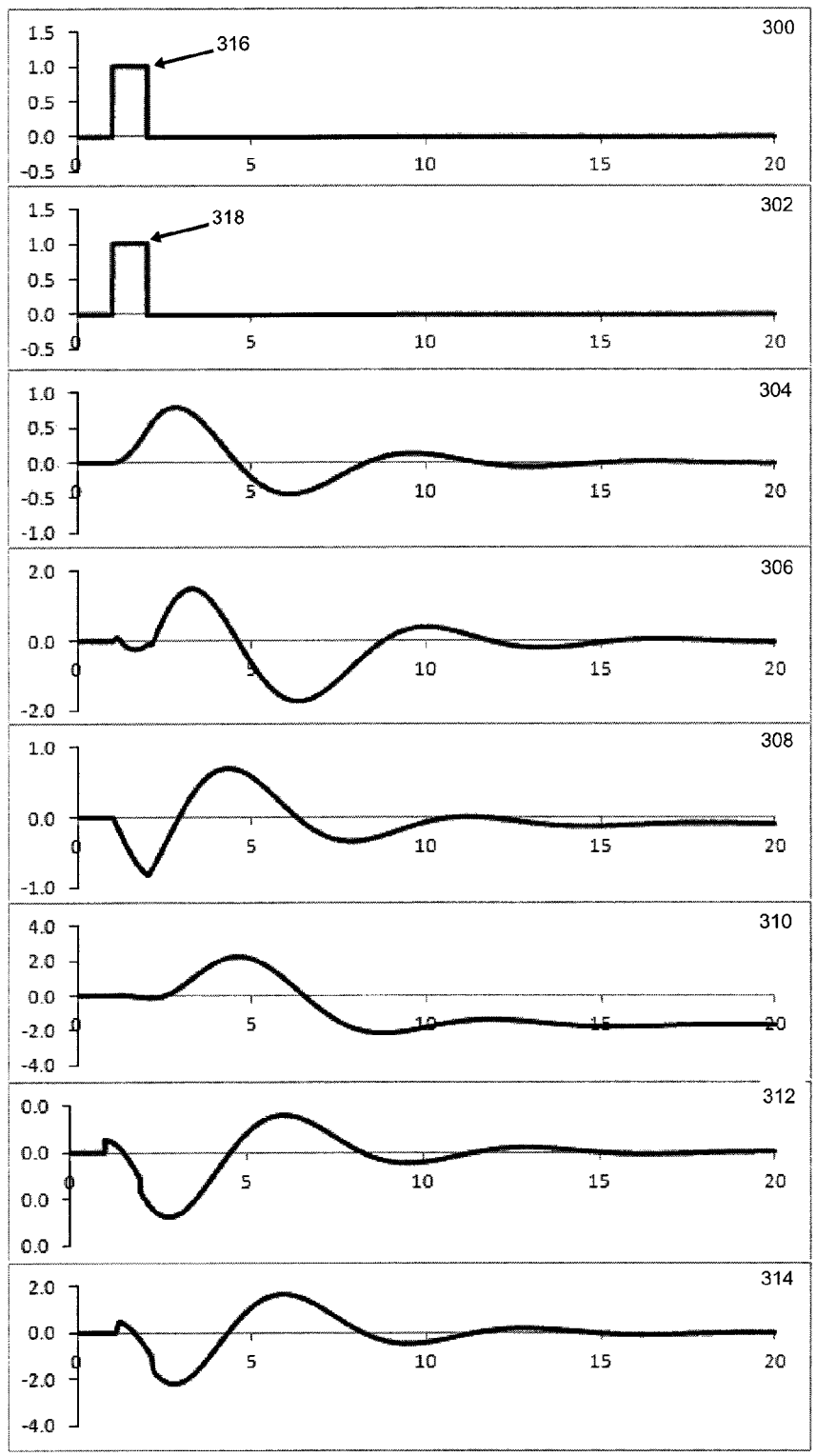
FIG. 3 is a time history of various parameters of an aircraft with an unstable dutch roll mode utilizing an embodiment of the alternative yaw damping system described herein.

Referring now to FIG. 3, a time history for an aircraft with an unstable dutch roll mode utilizing an embodiment of the alternative damping system described herein is depicted. Graphs depicting rudder command signal 300, rudder deflection 302, sideslip angle 304, roll rate 306, yaw rate 308, bank angle 310, lateral acceleration 312 and aileron deflection 314. Similarly to the other depictions, the dutch roll mode is excited by rudder command input 316.

Rudder deflection 318 excites the dutch roll mode as depicted in the oscillation of sideslip angle 304, roll rate 306 and yaw rate 308. In this case the classical damper is not utilized, so no rudder deflections are generated to counter the yaw after the deflection 318. Instead of rudder correction, aileron deflections as shown in graph 314 are utilized by the alternative damping system described herein to counter the dutch roll mode.

The aileron command signal is proportional to the lateral acceleration as can be seen by comparing graphs 312 and 314. The feedback of the lateral acceleration to the ailerons creates a roll moment that counteracts the roll component of the dutch roll mode as described above, damping the mode as shown by the return of sideslip angle 304, roll rate 306, and yaw rate 308 to return to a zero position.

The change in roll rate arising from the alternative damper may be seen by comparing graphs 106 and 206 with graph 306. The roll rate of graph 306 is roughly opposite in phase to the roll rate without the alternative damper in graphs 106 and 206. The damping effect requires multiple oscillations to complete the damping effect, but it does independently dampen the dutch roll mode without the need for yaw damping using a classical yaw damper system.

Figure 4:
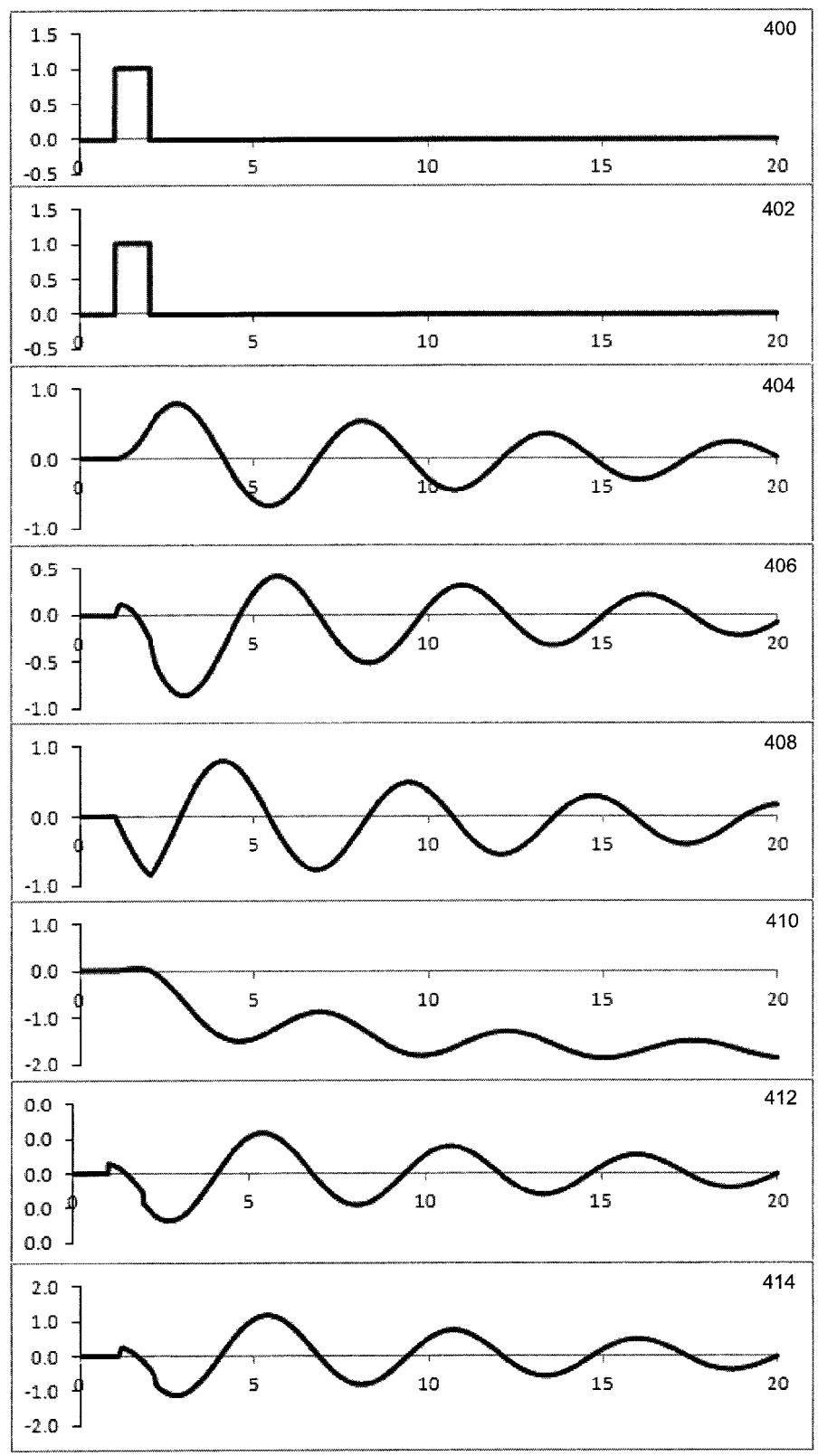
FIG. 4 is a time history of various parameters of an aircraft with an unstable dutch roll mode utilizing an alternative embodiment of the alternative yaw damping system described herein.

Referring now to FIG. 4, a time history for an aircraft with an unstable dutch roll mode utilizing an alternative embodiment of the alternative yaw damping system is depicted. In the embodiment depicted in FIG. 4, spoilers are utilized to provide the roll control commands necessary to dampen the dutch roll mode.

Graphs 400, 402, 404, 406, 408, 410, 412 and 414 respectively depict the rudder command signal, rudder deflection, sideslip angle, roll rate, yaw rate, bank angle, lateral acceleration, and the spoiler deflection. Similar to FIG. 3, the lateral acceleration is provided as feedback, with a proportional gain, to the roll controls resulting in the spoiler deflections depicted in graph 414. Since spoilers, which are typically located on the upper surface of the wing of an aircraft, have only positive deflections, the positive and negative deflections represent actuation of the spoilers on opposite wings of the aircraft. Comparing FIGS. 3 and 4, it can be seen that the system undergoes more periodic oscillations from the dutch roll mode before complete damping of the mode. However, the oscillations are successfully damped by the spoiler deflection and approach zero over time.

Figure 5:
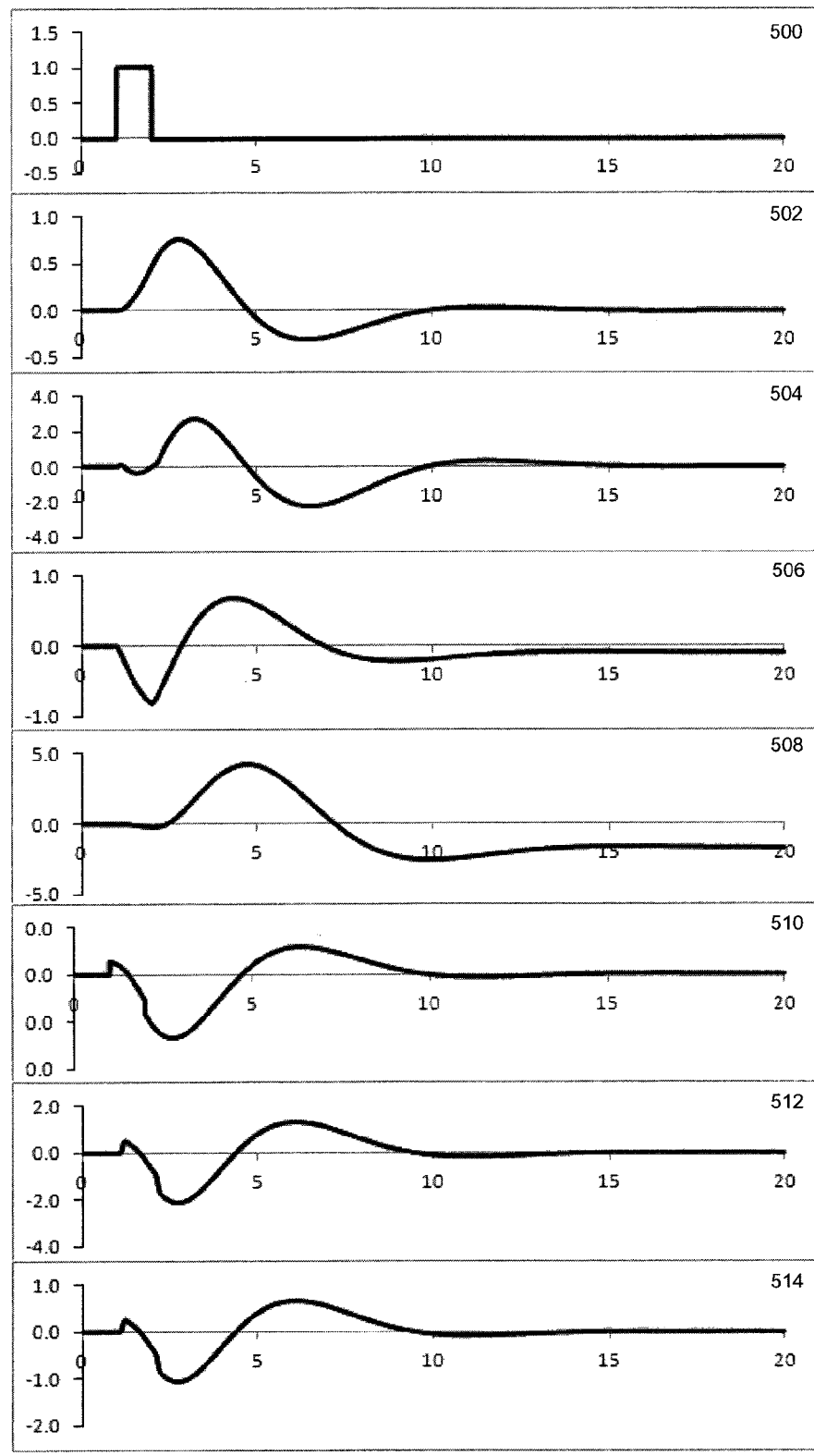
FIG. 5 is a time history of various parameters of an aircraft with an unstable dutch roll mode utilizing an alternative embodiment of the alternative yaw damping system.

Referring now to FIG. 5, a time history of various parameters of an aircraft with an unstable dutch roll mode utilizing an alternative embodiment of the alternative yaw damping system is depicted. The time histories in FIG. 5 depict the use of an alternative damper that utilizes both aileron and spoiler control surfaces to dampen the unstable dutch roll mode.

Graph 500 depicts a rudder command input designed to trigger the dutch roll mode instability. Graphs 502, 504, 506, 508, and 510 depict the sideslip angle, roll rate, yaw rate, bank angle, and lateral acceleration of the aircraft, respectively. Graphs 512 and 514 depict the total aileron command signal and the spoiler command signal, respectively.

The total aileron signal is a representation of the combination of left and right aileron deflections. Similarly, the spoiler signal comprises the combination of spoiler deflections from both sides of the aircraft, with one side being denoted a positive deflection when raised, and the other side being denoted a negative deflection when raised.

As can be seen in FIG. 5, the aileron and spoiler command signals, 510 and 512 respectively, are proportional to the lateral acceleration 510. Each signal has been calculated using a separate gain as described previously. The combined roll control input creates a roll moment that counteracts the sideslip angle 502 and produces the roll rate 504 that disrupts the unstable dutch roll mode.

Figure 6:
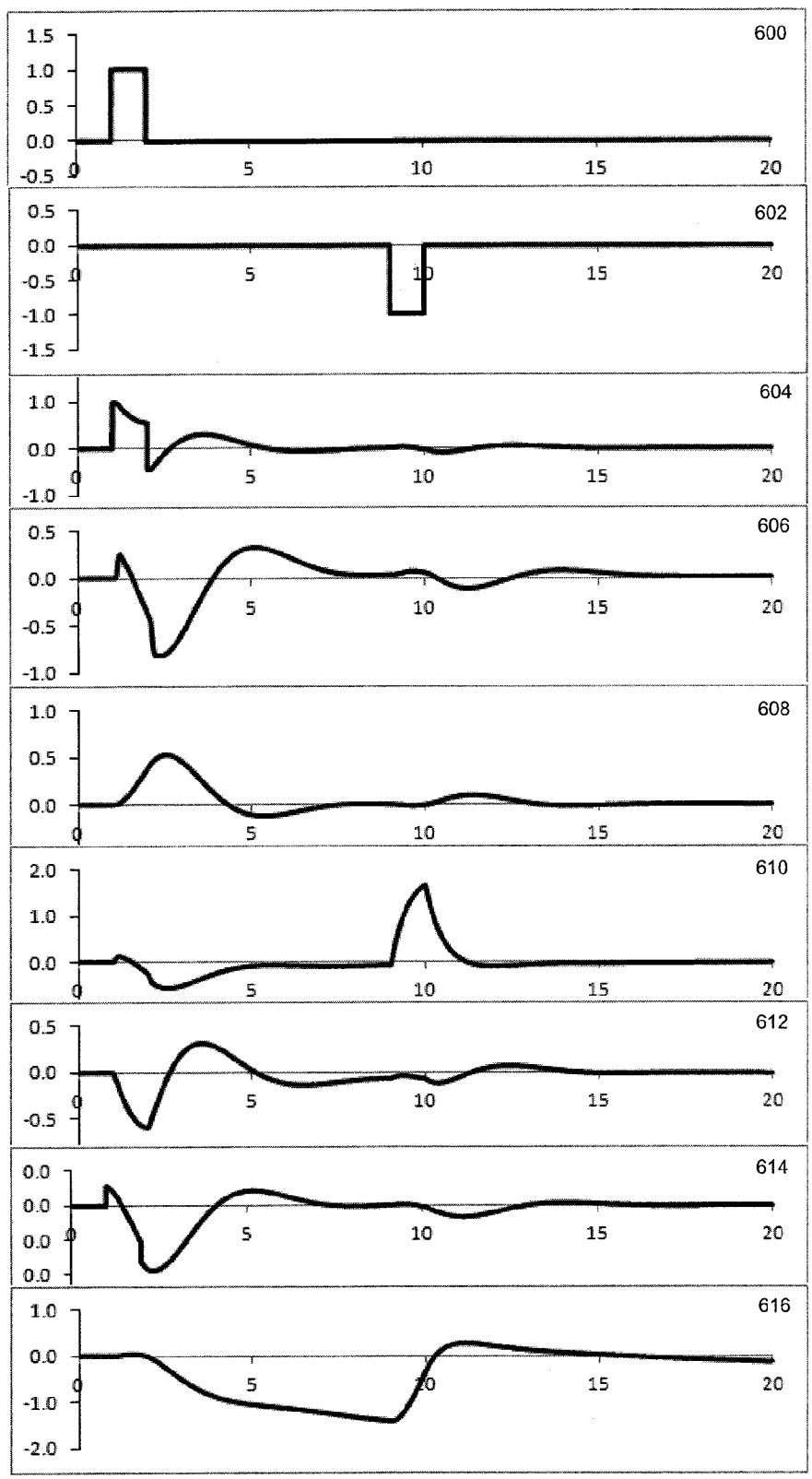
FIG. 6 is a time history of various parameters of an aircraft with an unstable dutch roll mode utilizing an embodiment of the alternative yaw damping system described herein and a classical yaw damper simultaneously.

Referring now to FIG. 6, time histories of various parameters of an aircraft with an unstable dutch roll mode utilizing an embodiment of the alternative damping system simultaneously with a classical yaw damper. The alternative damper shown in FIG. 6 utilizes the spoiler to counteract the dutch roll mode.

Graphs in FIG. 6 represent the rudder command signal 600, the total aileron command signal 602, the actual rudder deflection 604, the spoiler deflection 606, sideslip angle 608, roll rate 610, yaw rate 612, lateral acceleration 614 and bank angle 616, respectively.

Many aircraft require redundant systems for damping of the dutch roll mode so that the damping will continue even if a control surface such as a rudder is jammed and cannot function to dampen the dutch roll mode. Since both the classical yaw damper and the alternative damper may run continuously and simultaneously they must not interact in a manner that destabilizes the aircraft or prevents the two dampers from functioning properly together.

The classical yaw damper is shown in FIG. 6 by the modification of the rudder command signal 600 in proportion to the yaw rate 612 as reflected in the actual rudder deflection 604. The operation of the alternative damper is reflected in the spoiler deflections 606 that are proportional to lateral acceleration 614. The simultaneous operations of the two damping systems combine to remove the sideslip angle 608 and stabilize the dutch roll mode.

As can be seen in the bank angle 612, and in the bank angle graphs from previous figures, namely graphs 210, 310, 410 and 510, the excitation of the dutch roll mode and the resulting damping action leave a non-zero bank angle which increases over time as a result of the aircraft's spiral mode. Aileron command input such as that shown in graph 602 is often necessary to bring the aircraft back to level flight. As can be seen in FIG. 6, the alternative damper described herein does not impede the pilot's ability to correct the spiral mode of the aircraft through aileron input.

The combination of the classical yaw damper and the alternative damper stabilize the dutch roll mode at least as quickly as, and potentially more quickly than, the classical yaw damper alone. In addition, this figure shows that the classical yaw damper and the alternative damper may both be in operation simultaneously without impairing the operation of the other damper or destabilizing other aerodynamic modes of the aircraft.

Figure 7:
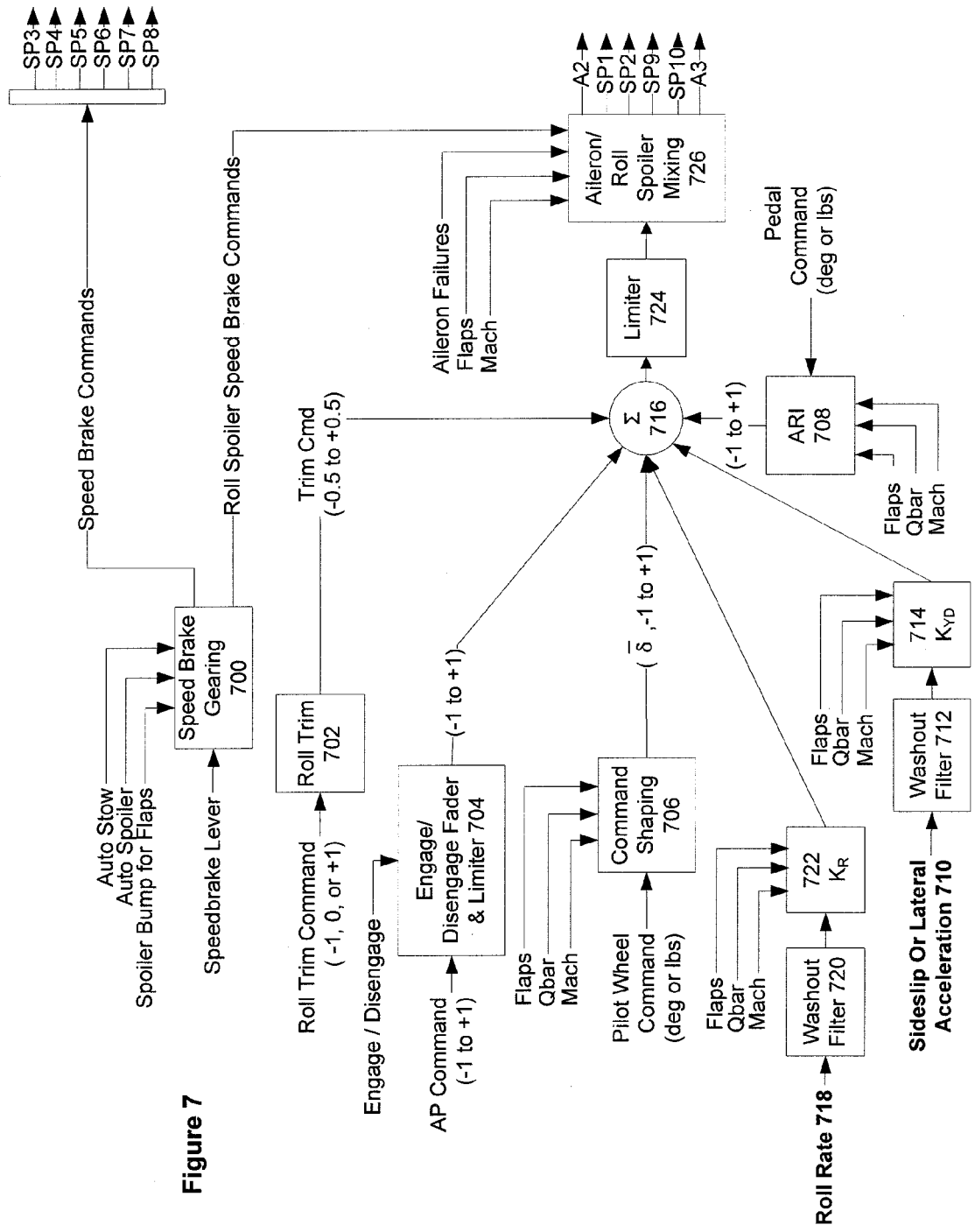
FIG. 7 is a diagram of a control law for the roll and drag control surfaces of an aircraft implementing an embodiment of the yaw damping system described herein.

Referring now to FIG. 7, a diagram of a roll and drag control law for an aircraft utilizing an embodiment of the alternative yaw damping system is depicted. The control law accepts various inputs, including in this system speed brake inputs 700, roll trim 702, autopilot commands 704, pilot commands 706, and aileron-rudder interconnect 708. In addition, the control law accepts the sideslip or lateral acceleration 710 of the aircraft. In other embodiments the control law may accept other measured parameters of the aircraft motion as described in the specification. In this embodiment, the control law also accepts the roll rate 718 as an input.

The lateral acceleration 710 and the roll rate 718 are filtered through washout filters 712 and 720, respectively, to remove the long term effects such as the effect of pilot commands. After application of the washout filters, the lateral acceleration 710 and roll rate 718 are multiplied by proportional gains, 714 and 722. The proportional gains are scheduled based on flight data such as airspeed or Mach, position of other flight control surfaces such as the flaps, and environmental parameters such as the dynamic pressure Qbar. In some embodiments, integral and derivative gains are applied to integral and derivative functions of lateral acceleration 710 and roll rate 718.

After calculation of the proportional command signal for lateral acceleration 710 and roll rate 718, the signals are summed with the other commands at 716, limited to the operational ranges of the control surfaces by limiter 724 and separated into discrete command signals for various roll control surfaces during mixing 726. In the depicted embodiment, command signals for ailerons A2 and A3, and spoilers SP1, SP2, SP9 and SP10 are generated by the control law.

The alternative damper may be executed on any component of the flight control system that has access to the necessary parameters, including a central flight control computer or dedicated processors for certain control surfaces such as the spoilers or ailerons. The alternative damper is suited for use with control surfaces that are typically electrically operated such as spoilers and so may require no additional control hardware.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. A method for damping the dutch roll mode in an aircraft having a roll control surface, comprising the steps of:
    measuring at least one parameter of the motion of the aircraft;
    applying a washout filter to the at least one parameter of motion;
    calculating a damping signal that is proportional to the at least one parameter of the motion of the aircraft; and
    actuating the roll control surface in proportion to the damping signal;
    wherein the step of calculating a damping signal further comprises multiplying the at least one parameter of motion by a proportional gain;
    wherein the step of calculating a damping signal further comprises the steps of calculating a derivative function of the at least one parameter of motion; multiplying the derivative function by a proportional gain; and adding the result to the damping signal;
    wherein the step of calculating a damping signal further comprises the steps of calculating an integral function of the at least one parameter of motion; multiplying the integral function by a proportional gain; and adding the result to the damping signal;

wherein the at least one parameter of motion is selected from the group consisting of lateral acceleration, sideslip angle, true airspeed, bank angle and yaw rate; and wherein the step of calculating a damping signal further comprises the steps of measuring the roll rate of the aircraft; multiplying the roll rate by a proportional gain; and adding the result to the damping signal.

2. The method of claim 1 wherein the step of calculating a damping signal further comprises applying a washout filter to the roll rate of the aircraft.

3. The method of claim 2 wherein the step of calculating a damping signal further comprises the steps of calculating a derivative function for the roll rate; multiplying the derivative function by a proportional gain; and adding the result to the damping signal.

4. The method of claim 3 wherein the step of calculating a damping signal further comprises the steps of calculating an integral function for the roll rate; multiplying the integral function by a proportional gain; and adding the result to the damping signal.

5. A method for damping the dutch roll mode of an aircraft comprising the steps of:

measuring at least one parameter of motion of an aircraft;

applying a washout filter to the at least one parameter of motion;

calculating the sideslip rate of the aircraft based on the at least one parameter of motion;

calculating a damping signal that is proportional to the sideslip rate of the aircraft; and actuating a roll control surface of the aircraft in proportion to the damping signal;

wherein the step of calculating a damping signal further comprises multiplying the sideslip rate by a proportional gain;

wherein the step of calculating a damping signal further comprises the steps of calculating a derivative function of the sideslip rate; multiplying the derivative function by a proportional gain; and adding the result to the damping signal;

wherein the step of calculating a damping signal further comprises the steps of calculating an integral function of the sideslip rate; multiplying the integral function by a proportional gain; and adding the result to the damping signal;

wherein the step of calculating the sideslip rate comprises calculating the sideslip rate based on the lateral acceleration, the airspeed, the bank angle and the yaw rate; and wherein the step of calculating a dampening signal further comprises the steps of measuring the roll rate of the aircraft; multiplying the roll rate by a proportional gain; and adding the result to the damping signal.

6. The method of claim 5 wherein the step of calculating a damping signal further comprises the steps of calculating a derivative function for the roll rate; multiplying the derivative function by a proportional gain; and adding the result to the damping signal.

7. The method of claim 6 wherein the step of calculating a damping signal further comprises the steps of calculating an integral function for the roll rate; multiplying the integral function by a proportional gain; and adding the result to the damping signal.

8. The method of claim 7 wherein the step of calculating a damping signal further comprises the step of applying a washout filter to the roll rate of the aircraft.

* * * * *